US009518158B1

United States Patent
Meza et al.

(10) Patent No.: US 9,518,158 B1
(45) Date of Patent: Dec. 13, 2016

(54) TIRE WITH STRATIFIED TREAD COMPOSITE

(71) Applicant: The Goodyear Tire & Rubber Company, Akron, OH (US)

(72) Inventors: Roberto Cerrato Meza, North Canton, OH (US); Junling Zhao, Hudson, OH (US); Leandro Forciniti, Canton, OH (US); Warren James Busch, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/792,892

(22) Filed: Jul. 7, 2015

(51) Int. Cl.
| | |
|---|---|
| *B60C 11/00* | (2006.01) |
| *C08J 5/00* | (2006.01) |
| *B60C 1/00* | (2006.01) |

(52) U.S. Cl.
CPC .. *C08J 5/00* (2013.01); *B60C 1/00* (2013.01); *B60C 1/0016* (2013.04); *B60C 11/00* (2013.01); *B60C 11/005* (2013.01); *B60C 11/0008* (2013.04); *B60C 11/0041* (2013.04); *C08J 2309/00* (2013.01); *C08J 2407/00* (2013.01)

(58) Field of Classification Search
CPC .......... B60C 1/00; B60C 1/0016; B60C 11/00; B60C 11/0041; B60C 11/005; B60C 11/0008
See application file for complete search history.

(56) References Cited

U.S. PATENT DOCUMENTS

| | | | |
|---|---|---|---|
| 5,451,646 A | 9/1995 | Castner | |
| 7,956,146 B2* | 6/2011 | Zhao | B60C 1/0016 152/209.1 |
| 8,445,580 B2* | 5/2013 | Zhao | B60C 1/0016 524/343 |
| 8,695,665 B2 | 4/2014 | Zhao | |
| 2002/0139461 A1* | 10/2002 | Pyle | B60C 1/0016 152/209.5 |
| 2012/0029114 A1* | 2/2012 | Francik | C08L 15/00 523/156 |

* cited by examiner

*Primary Examiner* — Satya Sastri
(74) *Attorney, Agent, or Firm* — Henry C. Young, Jr.

(57) ABSTRACT

The invention relates to a pneumatic rubber truck tire having a circumferential stratified dual cap rubber tread comprised of an outer tread cap and underlying tread sub cap. The underlying tread sub cap rubber layer is provided to support the outer tread cap rubber layer with similar physical properties. Both of the tread cap rubber compositions are comprised of a combination of natural cis 1,4-polyisoprene and dual cis 1,4-polybutadiene elastomers and contain reinforcing fillers comprised of precipitated silica and rubber reinforcing carbon black. The tread cap rubber compositions differ from each other by containing different levels of the individual cis 1,4-polybutadiene rubbers and by containing different rubber reinforcing carbon blacks and precipitated silica.

20 Claims, 1 Drawing Sheet

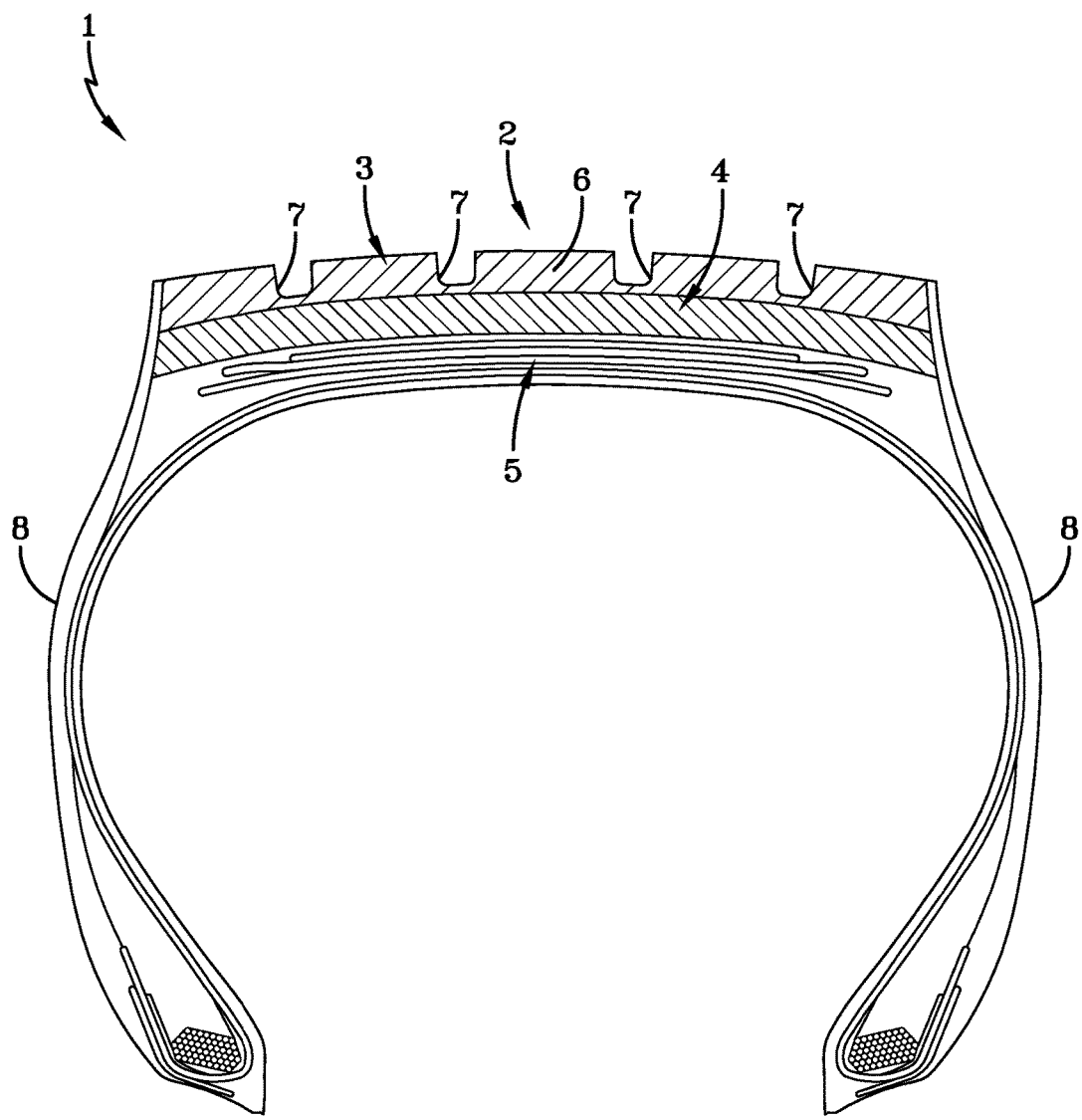

TIRE WITH STRATIFIED TREAD COMPOSITE

FIELD OF THE INVENTION

The invention relates to a pneumatic rubber truck tire having a circumferential stratified dual cap rubber tread comprised of an outer tread cap and underlying tread sub cap. The underlying tread sub cap rubber layer is provided to support the outer tread cap rubber layer with similar physical properties. Both of the tread cap rubber compositions are comprised of a combination of natural cis 1,4-polyisoprene and dual cis 1,4-polybutadiene elastomers and contain reinforcing fillers comprised of precipitated silica and rubber reinforcing carbon black. In one embodiment, the tread cap rubber compositions differ from each other by containing different levels of the individual cis 1,4-polybutadiene rubbers and by containing different rubber reinforcing carbon blacks and precipitated silica.

BACKGROUND OF THE INVENTION

Vehicular truck tires often have rubber treads of a rubber composition comprised of a combination of natural cis 1,4-polyisoprene rubber and polybutadiene rubber with carbon black reinforcing filler which may also contain silica as an additional reinforcing filler.

Historically, it has heretofore been proposed to replace the natural rubber of the tread rubber composition with a specialized and/or designated polybutadiene rubber. For example, see U.S. Pat. No. 7,956,146.

While such natural rubber-rich rubber treads often contain a small amount of synthetic cis 1,4-polybutadiene rubber to promote resistance to tread wear during use of the tire in heavy duty service, total replacement of the natural rubber with synthetic cis 1,4-polybutadiene rubber was considered to be a significant departure from past practice at that time.

A synthetic cis 1,4-polybutadiene rubber having a broad heterogeneity index was proposed for such purpose.

The cis 1,4-polybutadiene rubber was considered to be specialized in a sense of differing from a more conventional cis 1,4-polybutadiene elastomers by having a broad heterogeneity index, namely a significant difference between its number average molecular weight (Mn) and weight average molecular weight (Mw) in which the number average molecular weight (Mn) is relatively low for a cis 1,4-polybutadiene rubber. Such combination of wide heterogeneity index and relatively low Mn for the specialized cis 1,4-polybutadiene elastomer is believed to be indicative of a branched configuration for the elastomer, namely that the polymer structure has a degree of branching which, in turn, is believed to be responsible for better processability of the specialized cis 1,4-polybutadiene to thereby also enable the total replacement of the natural rubber for the tire tread on an uncured rubber processability basis.

For each of the outer tread cap and underlying sub tread cap of the stratified tread, it is proposed to provide rubber compositions comprised of a combination of natural cis 1,4-polyisoprene and dual cis 1,4-polybutadiene rubbers together with reinforcing fillers comprised of a combination of rubber reinforcing carbon black and precipitated silica. For the polybutadiene rubber, it is proposed to use a high performance polybutadiene rubber, referred to herein as a designated cis 1,4-polybutadiene rubber, to promote stiffness and abrasion resistance for the tread rubber composition. However, it is seen that such rubber is difficult to process because of its high uncured viscosity (Mooney viscosity) without significant addition of rubber processing aids which is further seen to unbalance one or more physical properties of the rubber composition. Therefore, it is desired to evaluate providing an additional more processable cis 1,4-polybutadiene rubber for the outer tread cap and sub cap components of the stratified tread (referred to herein as a specialized cis 1,4-polybutadiene rubber) together with natural cis 1,4-polyisoprene rubber to substantially maintain various cured physical properties of the rubber composition containing a combination of precipitated silica and carbon black while promoting better processability of the uncured rubber composition.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

The glass transition temperature (Tg) of the solid elastomers and liquid polymer may be determined by DSC (differential scanning calorimetry) measurements, as would be understood and well known by one having skill in such art. The number average molecular weight (Mn) of the solid elastomers and liquid polymer may be determined by GPC (gel permeation chromatography) measurements as would be understood and well known by one having skill in such art.

DISCLOSURE AND PRACTICE OF THE INVENTION

In accordance with this invention, a pneumatic rubber truck tire is provided having a circumferential stratified dual cap rubber tread comprised of an outer tread cap and an underlying tread sub cap wherein, based on parts by weight per 100 parts by weight rubber (phr), (A) said tread cap rubber composition is comprised of:
  (1) conjugated diene based elastomers comprised of about 20 to about 80 phr of natural cis 1,4-polyisoprene rubber (NR) and about 80 to about 20 phr of cis 1,4-polybutadiene rubber (BR),
  wherein said polybutadiene rubber (BR) is comprised of a combination of designated (BR1) and specialized (BR2) cis 1,4-polybutadiene elastomers, wherein, in terms of phr:
  (a) if BR is less than or equal to 40 phr, BR=BR1,
  (b) if BR is greater than 40 phr, $$BR1=25+((BR-25)/2)\times Y.$$

where Y=is a value in a range of from 0.2 to 1.6, and
  (2) about 40 to about 90, alternately from about 55 to about 80, phr of reinforcing filler comprised of about 50 to about 90 weight percent of a first rubber reinforcing carbon black and from about 10 to about 50 weight percent precipitated silica (synthetic amorphous silica) together with silica coupler (which may also be referred to as a silica coupling agent) for said precipitated silica containing a moiety reactive with hydroxyl groups on said precipitated silica and another different moiety interactive with said diene-based elastomers, (B) said tread sub-cap rubber composition is comprised of:
  (1) conjugated diene based elastomers comprised of about 40 to about 60 phr of natural cis 1,4-polyisoprene rubber (NR) and about 60 to about 40 phr of cis 1,4-polybutadiene rubber (BR),
wherein said polybutadiene rubber (BR) is comprised of a combination of designated (BR1) and specialized (BR2) cis 1,4-polybutadiene elastomers, wherein, in terms of phr:
(a) if BR is less than or equal to 40 phr, BR=BR1,
(b) if BR is greater than 40 phr, $$BR1=16+((BR-16)/2) \times Y$$

where Y=is a value in a range of from 0.2 to 1.6, and
(2) about 40 to about 90, alternately from about 55 to about 80, phr of reinforcing filler comprised of about 50 to about 90 weight percent of a second rubber reinforcing carbon black and from about 10 to about 50 weight percent precipitated silica (synthetic amorphous silica) together with silica coupler (silica coupling compound) for said precipitated silica containing a moiety reactive with hydroxyl groups on said precipitated silica and another, different moiety interactive with said diene-based elastomers,
wherein said specialized cis 1,4-polybutadiene rubber has a microstructure comprised of about 90 to about 99 percent cis 1,4-isomeric units, a number average molecular weight (Mn) in a range of from about 90,000 to about 220,000, alternately from 90,000 to 180,000 (a relatively low Mn for a cis 1,4-polybutadiene elastomer) and desirably a heterogeneity index (Mw/Mn) in a range of from about 2.5/1 to about 5/1 (a relatively high heterogeneity index range illustrating a significant disparity between its number average and weight average molecular weights), and
wherein said designated cis 1,4-polybutadiene rubber has a microstructure comprised of about 96 to about 99 percent cis 1,4-isomeric units, a number average molecular weight (Mn) in a range of from about 150,000 to about 300,000, alternately from 200,000 to 300,000 and desirably a heterogeneity index (Mw/Mn) in a range of from about 1.5/1 to about 2/1 (a significantly narrower heterogeneity index range illustrating a greater similarity between its weight average and number average molecular weights),
wherein said first rubber reinforcing carbon black for said tread cap rubber composition has an Iodine adsorption value (ASTM D1510) in a range of from about 100 to about 150 g/kg (which is indicative of a relatively small sized carbon black) together with a dibutyphthalate (DBP) adsorption number (ASTM D2414) of from about 110 to about 150 cc/100 g (which is indicative of a high structure carbon black), and
wherein said second rubber reinforcing carbon black for said tread sub cap rubber composition has an iodine adsorption value (ASTM D1510) in a range of from about 70 to about 130 g/kg (which is also indicative of a relatively small sized carbon black) together with a dibutyphthalate (DBP) adsorption number (ASTM D2414) of from about 80 to about 130 cc/100 g (which is also indicative of a relatively high structure carbon black).

In one embodiment, the second carbon black (for the tread sub cap rubber composition), has an Iodine value in a range of from about 80 to about 125 g/kg and a DBP value in a range of from about 120 to about 128 cc/100 g.

In one embodiment, the first carbon black (for the tread cap rubber composition), has:
(A) an Iodine value in a range of from about 118 to about 125 g/kg, and
(B) a DBP (dibutylphthalate) value;
(1) in a range of from about 128 to about 134 cc/100 g and at least about 5 units greater than the DBP value for the said second carbon black, or
(2) in a range of from about 112 to about 118 cc/100 g and least 5 units less than the DBP value for said second carbon black.

In such manner, then, the rubber reinforcing carbon black (second carbon back) for the tread sub cap rubber composition is similar to but differs from the rubber reinforcing carbon black (first carbon black) for the tread cap rubber composition.

It is appreciated that, in one embodiment, the tire is provided with the rubber tread cap and tread sub cap tire components as sulfur cured tire components.

In one embodiment, the tire is provided wherein the tread cap rubber composition contains levels of the said designated (BR1) and specialized (BR2) cis 1,4-polybutadiene rubbers different from the levels of said designated (BR1) and specialized (BR2) cis 1,4-polybutadiene rubbers contained in said tread sub cap rubber composition.

In one embodiment, said tread cap rubber composition contains up to about 40, alternately in a range of form about 10 to about 30, phr of at least one additional diene-based elastomer (R') comprised of, for example, styrene/butadiene rubber (SBR), wherein
(A) NR=100−BR−R'
(B) BR is in a range of from about 20 to about 80 (phr)
(C) BR=BR1+BR2, wherein:
(1) if BR is less than or equal to 40 phr, BR=BR1,
(2) if BR is greater than 40 phr, $$BR1=25+((BR-25)/2) \times Y$$

where Y=is a value in a range of from 0.2 to 1.6,
Representative of said specialized cis 1,4-polybutadiene rubber is, for example, Budene 4001™ from The Goodyear Tire & Rubber Company.

Representative of said designated cis 1,4-polybutadiene elastomer is, for example, Budene 1223™ and Budene 1224™ from The Goodyear Tire & Rubber Company and CB25™ from Lanxess Company.

Representative of first rubber reinforcing carbon blacks for the outer tread cap rubber composition are, for example, N121 and N205 (ASTM designations) having reported Iodine adsorption values of about 121 and about 121 g/kg, respectively together with DBP values of about 132 and about 115 cc/100 g, respectively.

Representative of second rubber reinforcing carbon blacks for the tread sub cap rubber composition are, for example, N234 and N347 (ASTM designations) having reported Iodine adsorption values of about 120 and 90 g/kg respectively together with DBP values of about 125 and 124 cc/100 g, respectively.

Examples of various rubber reinforcing carbon blacks together with their Iodine number values and DBP values, may be found in *The Vanderbilt Rubber Handbook*, (1990), 13th edition, Pages 416 through 419.

Use of the indicated high structure (DBP value) and high surface area (Iodine value) rubber reinforcing carbon black for the said tread cap rubber composition is considered herein to be important in order to promote good abrasion resistance and relatively high stiffness for the tire tread to thereby promote cornering and handling of the tire, and also promoting a relatively low hysteresis property (rebound property) for the tread rubber composition to resist internal heat generation within the tread cap rubber.

Use of the slightly different high structure and lower surface area, rubber reinforcing carbon black for the tread sub cap rubber composition is considered herein to be important in order to also promote stiffness for the tire tread with relatively low hysteresis (rebound) property for the tread rubber composition for a purpose of supporting and assisting the outer tread cap rubber to promote stiffness and a relatively low hysteresis (rebound) property to thereby promote resistance to internal heat generation within the tread sub cap rubber. In this manner, the tread sub cap is intended to add support for the outer tread cap rubber to thereby provide a stratified tread configured with a tread cap rubber layer with an underlying tread sub cap rubber layer desirably without an underlying tread base rubber layer.

A significant aspect of this invention is providing a stratified rubber tread with a balance of tread properties comprised of a combination of an outer tread cap of a rubber composition containing a combination of natural rubber and dual cis 1,4-polybutadiene rubbers with reinforcing filler comprised of a first carbon black and precipitated silica reinforcement together with an underlying tread sub cap of a rubber composition to add support for the outer tread cap comprised of combination of natural rubber and dual cis 1,4-polybutadiene rubbers in different ratios from the outer tread cap rubber composition and reinforcing filler comprised of a second carbon black and precipitated silica also of different ratios from the outer tread cap rubber composition.

In practice, the first rubber reinforcing carbon black for said outer tread cap rubber composition is intended to be exclusive of any appreciable amount of rubber reinforcing carbon blacks other than carbon blacks having the aforesaid combination of Iodine and DBP values. Therefore, in one embodiment, the first carbon black is intended to be exclusive of any appreciable amount of rubber reinforcing carbon black used for the tread sub cap rubber composition.

In practice, the second rubber reinforcing carbon black for said tread sub cap rubber composition is intended to be exclusive of any appreciable amount of rubber reinforcing carbon blacks other than carbon blacks having the aforesaid combination of iodine and DBP values. Therefore, in one embodiment, the second carbon black is intended to be exclusive of any appreciable amount of rubber reinforcing carbon black used for the tread outer cap rubber composition.

In practice, the silica coupling agent may be comprised of a bis (3-trialkoxysilylalkyl) polysulfide (e.g. bis(3-triethoxysilylpropyl polysulfide)) having an average of from 2 to 4, alternately an average of from about 2 to about 2.6 or an average of from about 3.4 to about 3.8, connecting sulfur atoms in its polysulfidic bridge or comprised of an alkoxyorganomercaptosilane. Such coupling agents are well known to those having skill in such art.

Basically, the precipitated silica for the reinforcing filler is a synthetic amorphous silica such as, for example, a precipitate silica obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available precipitated silicas (amorphous synthetic silicas) may be considered for use in this invention such as, for example, only and without limitation, silicas commercially available from Solvay with designations of Zeosil 1165MP and Zeosil 165GR and from Evonik and PPG.

As indicated, the silica reinforcement for the rubber tire tread is used with a coupling agent.

The coupling agents cause the silica to have a reinforcing effect on the rubber, many of which are generally known to those skilled in such art. Such silica coupling agents, for example, may be pre-mixed or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In one embodiment, said specialized cis 1,4-polybutadiene rubber is the product of polymerization (homo-polymerization) of 1,3-butadiene monomer in an organic solvent in the presence of an organonickel catalyst such as, for example, a catalyst composed of nickel octoate, triisobutylaluminum, hydrogen fluoride and parastyrenated diphenylamine.

In one embodiment, said designated cis 1,4-polybutadiene rubber is the product of polymerization (homo-polymerizing) 1,3-butadiene monomer in an organic solvent in the presence of a neodymium based catalyst (neodymium based catalyst instead of catalyst containing any of cobalt, titanium or lithium).

BRIEF DESCRIPTION OF ACCOMPANYING DRAWING

A cross-sectional drawing of a truck tire is provided to illustrate its tread being composed of dual tread cap rubber layers comprised of a combination of outer tread cap rubber layer and an underlying tread sub base rubber layer without a tread base rubber layer between the tread and tire carcass.
In the Drawing FIG. 1 (FIG. 1) is presented to illustrate a cross-section of a pneumatic truck tire (1) with a circumferential tread (2), reinforcing belts (5) underlying the tread (2) and sidewalls (8) overlaying the side portions of the tread (2).

The tread (2) is configured with dual tread cap rubber layers comprised of a combination of outer tread cap layer (3) and underlying tread sub base rubber layer (4).

The outer tread cap layer (3) is designed to be ground-contacting and is illustrated with spaced apart tread grooves (7).

The tread (2) of the tire (1) is provided without an underlying tread base rubber layer (not shown). Instead, the tread (2) is divided into the aforesaid combination of outer tread cap (3) and underlying tread sub base (4) where the tread sub base (4) is of sufficiently similar rubber composition as the outer tread cap (3) so that it composition is more like the tread cap rubber layer (3) than a tread base rubber layer (not shown).

For the drawing, the rubber composition of the outer tread cap (6) is comprised of a combination of natural rubber and dual cis 1,4-polybutadiene rubbers (Budene 4001™ and Budene 1224™) with reinforcing filler composed of a first rubber reinforcing carbon black as N121 and precipitated silica together with a silica coupler comprised of a bis(3-trialkoxysilylpropyl) polysulfide.

For the drawing, the rubber composition of the underlying tread sub cap (4) is comprised of a combination of natural rubber and dual cis 1,4-polybutadiene rubbers (Budene 4001™ and Budene 1224™) of different levels from the polybutadienes of the outer tread cap (3) with reinforcing filler composed of a second rubber reinforcing carbon black as N234 and precipitated silica together with a silica coupler comprised of a bis(3-trialkoxysilylpropyl) polysulfide.

In practice, the specialized cis 1,4-polybutadiene rubber may be prepared, for example, by organic solvent solution polymerization of 1,3-butadiene monomer in the presence of an organonickel based catalyst, particularly a catalyst comprised of an organonickel compound, an organoaluminum compound, a fluorine-containing compound and a parastyrenated diphenylamine which method is exemplified in U.S. Pat. No. 5,451,646. Such catalyst components, as indicated in said U.S. Patent, may be composed of nickel octoate, triisobutylaluminum, hydrogen fluoride and parastyrenated diphenylamine. It is considered herein that said specialized cis 1,4-polybutadiene may suitably be prepared by such polymerization without undue experimentation. While the technical aspect may not be fully understood, it is a feature of this invention that the specialized cis 1,4-polybutadiene rubber is differentiated from other cis 1,4-polybutadiene rubbers as being required to be the product of organic solvent solution polymerization of 1,3-butadiene monomer in the presence of the nickel octoate, triisobutylaluminum, hydrogen fluoride and parastyrenated diphenyl amine based catalyst.

The relatively broad heterogeneity index (Mw/Mn ratio range of from 2.5/1 to 5/1) of the specialized cis 1,4-polybutadiene elastomer is considered herein to be significant to promote improved processing of the unvulcanized specialized cis 1,4-polybutadiene rubber based rubber composition as compared to the designated cis 1,4-polybutadiene elastomer having a higher number average molecular weight (Mn) and narrower and lower heterogeneity index of, for example, from about 1.5/1 to about 2/1. The specialized cis 1,4-polybutadiene elastomer is also considered unique in that it is considered to have a degree of branched configuration which is considered herein to aid in its enhanced unvulcanized processability.

In the practice of this invention, use of specialized cis 1,4-polybutadiene rubber in a silica reinforcement-containing rubber composition, together with a coupling agent for the silica is considered herein to be important in order to optimize resistance to the rubber composition's abrasion (resistance to tread wear) and to promote a suitable hysteresis (e.g. rolling resistance) as well as suitable tear strength.

In practice, the designated cis 1,4-polybutadiene rubber may be prepared, for example, by organic solvent solution polymerization of 1,3-butadiene monomer in the presence of a neodymium based catalyst (without catalyst cobalt, titanium or lithium compounds). It is considered herein that said designated cis 1,4-polybutadiene may suitably be prepared by such polymerization without undue experimentation. While the technical aspect may not be fully understood, it is a feature of this invention that the designated cis 1,4-polybutadiene rubber is differentiated from other cis 1,4-polybutadiene rubbers as being required to be the product of organic solvent solution polymerization of 1,3-butadiene monomer in the presence of a neodymium catalyst (not the nickel octoate, triisobutylaluminum, hydrogen fluoride and parastyrenated diphenyl amine based catalyst required for the specialized cis 1,4-polybutadiene rubber).

The significantly narrower heterogeneity index (Mw/Mn ratio range of from about 1.5/1 to 2/1) of the designated cis 1,4-polybutadiene elastomer, its higher number average molecular weight (Mn) of about 150,000 to about 300,000, alternately from about 200,000 to about 300,000, as well as its required neodymium catalyst based derivation is considered herein to be significant in a sense of differentiating it from said specialized cis 1,4-polybutadiene rubber with its significantly broad heterogeneity index and significantly lower number average molecular weight (Mn) and required nickel-amine based catalyst derivation.

The precipitated silica for the reinforcing filler is a synthetic amorphous silica such as, for example, those obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available synthetic silicas, particularly precipitated silicas, may be considered for use in this invention such as, for example, only and without limitation, silicas commercially available from Solvay with designations of Zeosil 1165MP and Zeosil 165GR as well as from Evonik and PPG.

The silica reinforcement for the rubber tire tread is used with a coupling agent.

The coupling agents cause the silica to have a reinforcing effect on the rubber, many of which are generally known to those skilled in such art. Such silica coupling agents, for example, may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such silica coupling agents may, for example, be composed of an alkoxy silane which has a constituent component, or moiety, (the alkoxy portion) capable of reacting with the silica surface (e.g. hydroxyl groups on the silica surface) and, also, a constituent component, or moiety, capable of reacting with the rubber, particularly a sulfur vulcanizable rubber which contains carbon-to-carbon double bonds, or unsaturation. In this manner, then the coupling agent acts as a connecting bridge between the silica and the rubber and thereby enhances the rubber reinforcement aspect of the silica in a manner known to those having skill in such art.

Numerous coupling agents are taught for use in combining silica and rubber such as, for example, silane coupling agents containing a polysulfide component, or structure, such as bis-(3-alkoxysilylalkyl) polysulfide which contains an average from 2 to about 4 (such as for example a range of from 2 to about 2.6 or a range of from 3.4 to about 3.8) connecting sulfur atoms in its polysulfidic bridge such as, for example, a bis-(3-triethoxysilylpropyl) polysulfide.

A coupling agent comprised of a bis-(3-ethoxysilylpropyl) polysulfide having an average of from about 2 to 2.6 connecting sulfur atoms in its polysulfidic bridge may be particularly desired in order to promote ease of processing, particularly mixing, the unvulcanized rubber composition.

For this invention, it is desired that the sulfur cured rubber compositions for the tire tread outer cap rubber layer and underlying tread base rubber layer provide the following target physical properties which are presented as being desirable physical properties as shown in the following Table A. It is readily observed that the desirable storage modulus values are similar for the tread cap and underlying sub cap rubber layers as well as the hot rebound values and Grosch high severity abrasion rates.

TABLE A

|  | Tread Cap Rubber | Tread Sub Cap Rubber |
|---|---|---|
| Hot rebound (100° C. rebound) of cured rubber | 60-70 | 60-80 |
| Grosch abrasion rate (high severity), mg/km of cured rubber | 200-450 | 350-550 |
| Dynamic storage modulus G', 100° C., of cured rubber (MPa) | 1.7-2 | 1.7-2 |
| Dynamic storage modulus G', 100° C., of uncured rubber (MPa) | <0.26 | <0.26 |

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, fatty acid comprised of, for example, stearic, oleic, palmitic, and possibly linolenic, acids, zinc oxide, sulfur-contributing material(s) and vulcanization accelerator(s) as hereinbefore mentioned.

Processing aids if used, for example, may be waxes such as microcrystalline and paraffinic waxes, in a range, for example, of about 1 to 5 phr or about 1 to about 3 phr; and resins if used, usually as tackifiers, may be, for example, one or more of synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following example in which the parts and percentages are by weight unless otherwise indicated.

EXAMPLE I

Tread Cap Rubber Composition Evaluation

Rubber Compositions were Prepared to Evaluate Rubber Compositions for a Tread Cap rubber layer comprised of dual cis 1,4-polybutadienes together with natural rubber which contain reinforcing filler comprised of a combination of as a first rubber reinforcing carbon black (N121) and precipitated silica together with silica coupler for the precipitated silica with the cis 1,4-polybutadienes comprised of a combination of designated (BR1) and specialized (BR2) cis 1,4-polybutadienes.

Such rubber compositions are referred to in this Example as rubber Samples A and B with rubber Sample A being a comparative rubber Sample.

The basic rubber composition formulation is shown in Table 1 and the ingredients are expressed in parts by weight per 100 parts rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

TABLE 1

|  | Parts (phr) |
|---|---|
| Non-Productive Mixing Step (NP) - Mixed to 160° C. |  |
| Natural cis 1,4-polyisoprene rubber (SMR20) | 20-49 |
| Specialized cis 1,4-polybutadiene rubber (BR2)[1] | 20-40 |
| Designated cis 1,4-polybutadiene rubber (BR1)[2] | 31-40 |
| First rubber reinforcing carbon black (N121 or N205)[3] | 30-60 |
| Silica, precipitate[4] | 10-30 |
| Silica coupling agent[5] | 2.6 |
| Wax microcrystalline and paraffin | 1.5 |
| Fatty acid[6] | 2 |
| Antioxidants | 2.8 |
| Zinc oxide | 3 |
| Productive Mixing Step (PR) - Mixed to 110° C. |  |
| Sulfur | 1 |
| Accelerator(s)[7] | 2 |

[1]Specialized cis 1,4-polybutadiene rubber (BR2), (said nickel-amine catalyzed 1,3-butadiene monomer) as Budene 4001 ™ from The Goodyear Tire & Rubber Company having a Tg of about −105° C. and heterogeneity index in a range of from about 2.5/1 to about 3/1
[2]Designated cis 1,4-polybutadiene rubber (BR1), (said neodymium based polymerized 1,3-butadiene as Budene ™ 1223 from The Goodyear Tire & Rubber Company having a heterogeneity index in a range of from about 1.5 to about 2/1)
[3]Rubber reinforcing carbon black as a first carbon black as N121 or N205 carbon black, ASTM designations
[4]Precipitated silica as Zeosil ™ Z1165 MP from the Rhodia Company
[5]Coupling agent comprised of bis(3-triethoxysilylpropyl) polysulfide having an average of from about 3.4 to about 3.8 connecting sulfur atoms as Si69 ™ from Evonik
[6]Mixture comprised of stearic, palmitic and oleic acids
[7]Sulfenamide and diphenyl guanidine sulfur cure accelerators The following Table 2 represents the uncured and cure behavior and various physical properties of the rubber compositions based upon the basic formulation of Table 1, and reported as a Control, or Comparative, rubber Sample A and Experimental rubber Sample B.

TABLE 2

|  | Control A | Experimental B |
|---|---|---|
| Natural rubber - SMR-20 (phr) | 100 | 40 |
| Specialized cis 1,4-polybutadiene rubber (BR2) (phr) | 0 | 30 |
| Designated cis 1,4-polybutadiene rubber (BR1) (phr) | 0 | 30 |
| First rubber reinforcing carbon black (N121) | 50 | 45 |
| Precipitated silica | 0 | 15 |
| Properties | | |
| RPA test | | |
| Uncured dynamic storage modulus G' (MPa) At 10% strain, 11 Hertz, 100° C. (cured rubber); | 0.211 | 0.219 |
| Dynamic storage modulus G' (MPa) | 1.6 | 1.7 |
| Tan delta | 0.15 | 0.11 |
| MDR (moving disk rheometer) test; 60 minutes at 150° C. | | |
| Maximum torque (dN-m) | 18.6 | 20.3 |
| Minimum torque (dN-m) | 2.9 | 3.3 |
| T90 (minutes) | 7.3 | 10.9 |
| Stress-strain | | |
| Tensile strength (MPa) | 22 | 19 |
| Elongation at break (%) | 522 | 450 |
| 300% modulus, ring, (MPa) | 12 | 10.5 |
| Rebound (Zwick) | | |
| 23° C. | 47 | 55 |
| 100° C. | 62 | 65 |
| Shore A Hardness | | |
| 23° C. | 66 | 66 |
| 100° C. | 60 | 62 |
| Tear Strength[1], N | | |
| At 23° C. | 180 | 160 |
| At 95° C. | 160 | 140 |
| Abrasion rate (mg/km), Grosch[2] | | |
| Medium severity (40N), 6° slip angle, disk Speed = 20 km/hr, distance = 1,000 meters | 67.3 | 57.4 |
| High severity (70N), 12° slip angle, disk speed = 20 km/hr, distance = 250 meters | 770 | 410 |

[1]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

[2]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters.

It can be seen from Table 2 that the abrasion rate of Experimental rubber Sample B for the tread cap rubber composition with 60 phr of the combination of performance promoting designated (BR1) and more processable specialized cis 1,4-polybutadiene elastomer (BR2) in a 30/30 ratio thereof in the absence of natural rubber was beneficially significantly lower for both of the medium and high abrasion rate tests than the Control rubber Sample A with 100 phr of the natural rubber. This is considered herein to represent a significant predictive beneficial improvement (reduction) in tread wear for a tire tread of such rubber composition where the natural rubber was replaced with the combination of designated (BR1) and specialized (BR2) cis 1,4-polybutadiene rubbers.

This is considered herein as being significant for demonstrating that use of the relatively higher performance designated (BR1) cis 1,4-polybutdiene rubber can be implemented in place of the natural rubber provided that the rubber composition also contains the more processable specialized (BR2) polybutadiene rubber to enable processing of the uncured rubber composition while achieving improved abrasion resistance without significant loss of tear strength which is considered herein to thereby promote tire tread durability for a tire with tread of such rubber composition.

Further, it is also seen that the uncured storage modulus (G') of 0.219 MPa for the uncured Experimental rubber Sample B composed of the combination of natural rubber and designated and specialized cis 1,4-polybutadiene rubbers instead of the natural rubber of Control rubber Sample A was similar to the uncured storage modulus (G') of 0.211 MPa for the uncured natural rubber containing Control rubber Sample A which indicates that the processability of the uncured rubber Samples A and B was similar.

In addition, it is also seen that the hysteresis of the tread cap rubber was beneficially increased by the use of the combination of high performance designated cis 1,4-polybutadiene (higher performance in its cured state) and more processable specialized cis 1,4-polybutadiene (more processable in its uncured state) as indicated by the increased rebound values (both hot and room temperature rebound values) and reduction in tangent delta (tan delta) values for the cured Experimental rubber Sample B as compared to the cured Control rubber Sample A. This is beneficially predictive of lower internal heat generation for Experimental rubber Sample B during working conditions (e.g. tire tread working conditions) and resultant beneficial increase in durability of the rubber composition as a tire tread cap layer.

An additional feature of the Experimental rubber Sample B with the dual cis 1,4-polybutadiene elastomers is the use of filler reinforcement as a combination of precipitated silica (together with silica coupler) and relatively higher structure (higher DBP value of 130 to 140 cc/100 g) rubber reinforcing carbon black, namely the N121 or N205 carbon black, as compared to use of a lower high structure carbon black (with somewhat lower DBP value of 110 to 125 cc/100 g) for the rubber reinforcing carbon black, namely the N234 or N347 carbon black, for the tread sub-cap rubber composition illustrated in the following Example II to promote good abrasion resistance and relatively high stiffness for the rubber composition of the tread cap layer.

EXAMPLE II

Tread Sub Cap Rubber Composition Evaluation

Rubber compositions were prepared to evaluate a tread sub cap rubber composition.

Rubber Sample C was a Control or Comparative natural rubber based rubber composition and Experimental rubber Sample D was comprised of a combination of natural rubber and specialized and designated cis 1,4-polybutadiene rubbers (in different levels from Experimental rubber Sample B for the tread cap rubber composition of Example I) together with reinforcing fillers as a second rubber reinforcing carbon black and precipitated silica together with silica coupler.

The basic rubber composition formulation is shown in Table 3 and the ingredients are expressed in parts by weight per 100 parts rubber (phr) unless otherwise indicated.

The rubber compositions may be prepared in the manner of Example I.

TABLE 3

| | Parts (phr) |
|---|---|
| Non-Productive Mixing Step (NP) - Mixed to 160° C. | |
| Natural cis 1,4-polyisoprene rubber (SMR20) | 20-49 |
| Specialized cis 1,4-polybutadiene rubber (BR2)[1] | 20-40 |
| Designated cis 1,4-polybutradiene rubber (BR1)[2] | 31-40 |
| Second rubber reinforcing carbon black (N234 or N347)[3] | 30-60 |
| Silica, precipitate[4] | 10-30 |
| Silica coupling agent[5] | 2.6 |
| Wax microcrystalline and paraffin | 1.5 |
| Fatty acid[6] | 2 |
| Antioxidants | 2.8 |
| Zinc oxide | 3 |
| Productive Mixing Step (PR) - Mixed to 110° C. | |
| Sulfur | 1.4 |
| Accelerator(s)[7] | 2 |

The following Table 4 represents the uncured and cure behavior and various physical properties of rubber compositions based upon the basic formulation of Table 3, and reported as Control, or Comparative, rubber Sample C and Experimental rubber Sample D.

TABLE 4

| | Control C | Experimental D |
|---|---|---|
| Natural rubber - SMR-20 (phr) | 100 | 60 |
| Specialized cis 1,4-polybutadiene rubber (BR2) (phr) | 0 | 20 |
| Designated cis 1,4-polybutadiene rubber (BR1) (phr) | 0 | 20 |
| Second rubber reinforcing carbon black (N234 or N347) | 50 | 40 |
| Precipitated silica | 0 | 20 |
| Properties | | |
| RPA test | | |
| Uncured dynamic storage modulus G' (MPa) At 10% strain, 11 Hertz, 100° C. (cured rubber); | 0.165 | 0.184 |
| Dynamic storage modulus G' (MPa) | 1.23 | 1.6 |
| Tan delta | 0.138 | 0.1 |
| MDR (moving disk rheometer) test; 60 minutes at 150° C. | | |
| Maximum torque (dN-m) | 15.3 | 20.4 |
| Minimum torque (dN-m) | 1.9 | 2.6 |
| T90 (minutes) | 14.3 | 11.6 |
| Stress-strain | | |
| Tensile strength (MPa) | 22.5 | 20 |
| Elongation at break (%) | 470 | 450 |
| 300% modulus, ring, (MPa) | 11.1 | 17.1 |
| Rebound (Zwick) | | |
| 23° C. | 60 | 60 |
| 100° C. | 70 | 70 |
| Shore A Hardness | | |
| 23° C. | 60 | 60 |
| 100° C. | 55 | 57 |
| Tear Strength[1], N | | |
| At 23° C. | 120 | 147 |
| At 95° C. | 100 | 102 |
| Abrasion rate (mg/km), Grosch[2] | | |
| Medium severity (40N), 6° slip angle, disk Speed = 20 km/hr, distance = 1,000 meters | 113 | 73 |
| High severity (70N), 12° slip angle, disk speed = 20 km/hr, distance = 250 meters | 1150 | 520 |

The physical tests were those indicated for Table 2 of Example I.

It is important to appreciate that a significant purpose of the underlying tread sub-cap rubber is to support the tread cap rubber without use of an underlying tread base rubber layer. In this manner, then, it is desired for the tread sub cap rubber composition to provide similar, but slightly reduced, cured stiffness (storage modulus G') and hysteresis (evidenced by comparable cured rubber rebound and tan delta physical properties) as well as similar durability in a sense of resistance to abrasion (as evidenced to its Grosch rate of abrasion resistance).

For Experimental rubber Sample D, the natural rubber of Control rubber Sample C was partially replaced with 40 phr of a combination of the designated (high performance) cis 1,4-polybutadiene and specialized (more processable) cis 1,4-polybutadiene in a 50/50 ratio thereof.

It can be seen from Table 4 that that abrasion rates of the Experimental rubber Sample D with combination of designated (BR1) (high performance) cis 1,4-polybutadiene rubber and specialized (BR2) (more processable) cis 1,4-polybutadiene rubber (in a 50/50 ratio) was beneficially significantly lower for the medium and high severities of the abrasion tests as compared to the natural rubber based Control rubber Sample C, although somewhat higher than the abrasion rates for Experimental rubber Sample B for the tread cap rubber composition. This is considered herein important for the sub cap rubber to support the overlaying tread cap rubber layer without significant increase in hysteresis (e.g. without a significant change in rebound and tan delta physical properties of cured rubber compositions of rubber Samples C and D).

It is seen that the tear strength property was maintained or even improved for the Experimental rubber Sample D at both 23° C. and 95° C. and was similar although somewhat less than the tear resistance for the tread cap rubber. This is also important for the sub cap rubber to support the overlaying tread cap rubber layer.

Further, it is also seen that the uncured storage modulus (G') of 0.184 MPa for the uncured Experimental rubber Sample D composed of the combination of designated (BR1) and specialized (BR2) cis 1,4-polybutadiene rubbers replacing a portion of the natural rubber of Control rubber Sample C was similar to the uncured storage modulus (G') of 0.165 MPa for the uncured natural rubber containing Control rubber Sample C which indicates that the processability of the uncured rubber Samples C and D was similar.

In addition, it is also seen that the hysteresis of the tread sub cap rubber was somewhat decreased by the replacement of a portion of the natural rubber by the combination of 40 phr pf high performance designated cis 1,4-polybutadiene (higher performance in its cured state) and more processable specialized cis 1,4-polybutadiene (more processable in its uncured state) in a 20/20 ratio thereof as indicated by the same rebound values (both hot and room temperature rebound values) and somewhat of a reduction in the tangent delta (tan delta) values reported in Table 4 for the cured Experimental rubber Sample D as compared to the cured Control rubber Sample C. This is believed to provide favorable restriction in internal heat generation for Experimental rubber Sample D during working conditions (e.g. tire tread working conditions) with resultant beneficial increase in durability of the rubber composition as a tire tread sub cap layer to support the overlaying tread cap layer.

An additional feature of the Experimental rubber Sample D with the dual cis 1,4-polybutadeiene elastomers replacing a portion of the natural rubber is the use of filler reinforcement as a combination of precipitated silica (together with silica coupler) and relatively high structure (higher DBP value of 110 to 125 cc/100 g) rubber reinforcing carbon black, namely the N234 or N347 carbon black, as compared to use of a higher high structure carbon black (with somewhat higher DBP value of 130 to 140 cc/100 g) for the rubber reinforcing carbon black, namely the N121 or N205 carbon black, for the tread cap rubber composition illustrated in the previous Example I to promote good abrasion resistance and relatively high stiffness for the rubber composition of the tread sub cap layer to, in turn, support the overlaying tread cap layer.

This is considered herein as being significant for demonstrating that the designated (BR1) cis 1,4-polybutadiene rubber can replace a portion of the natural rubber if the specialized (BR2) polybutadiene rubber is included for achieving abrasion resistance while maintaining tear strength to promote durability of a tread sub cap rubber to support the overlaying tread cap rubber.

It is therefore concluded that the benefits of replacing a portion of the natural rubber with the designated (BR1) cis 1,4-polybutadiene rubber can be accomplished where specialized (BR2) cis 1,4-polybutadiene rubber is provided in combination with the designated (BR1) polybutadiene rubber.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber truck tire having a circumferential stratified dual cap rubber tread comprised of an outer tread cap and an underlying tread sub cap wherein, based on parts by weight per 100 parts by weight rubber (phr),
   (A) said tread cap rubber composition is comprised of:
   (1) conjugated diene based elastomers comprised of about 20 to about 80 phr of natural cis 1,4-polyisoprene rubber (NR) and about 80 to about 20 phr of cis 1,4-polybutadiene rubber (BR),
   wherein said polybutadiene rubber (BR) is comprised of a combination of designated (BR1) and specialized (BR2) cis 1,4-polybutadiene rubbers, wherein, in terms of phr:
   (a) if BR is less than or equal to 40 phr, BR=BR1,
   (b) if BR is greater than 40 phr, $$BR1 = 25 + ((BR-25)/2) \times Y$$

where Y=is a value in a range of from 0.2 to 1.6, and
   (2) about 40 to about 90 phr of reinforcing filler comprised of about 50 to about 90 weight percent of a first rubber reinforcing carbon black and from about 10 to about 50 weight percent precipitated silica together with silica coupler for said precipitated silica containing a moiety reactive with hydroxyl groups on said precipitated silica and another different moiety interactive with said diene-based elastomers,
   (B) said tread sub-cap rubber composition is comprised of:
   (1) conjugated diene based elastomers comprised of about 40 to about 60 phr of natural cis 1,4-polyisoprene rubber (NR) and about 60 to about 40 phr of cis 1,4-polybutadiene rubber (BR),
   wherein said polybutadiene rubber (BR) is comprised of a combination of designated (BR1) and specialized (BR2) cis 1,4-polybutadiene rubbers, wherein, in terms of phr:
   (a) if BR is less than or equal to 40 phr, BR=BR1,
   (b) if BR is greater than 40 phr, $$BR1 = 16 + ((BR-16)/2) \times Y$$

where Y=is a value in a range of from 0.2 to 1.6, and
   (2) about 40 to about 90 phr of reinforcing filler comprised of about 50 to about 90 weight percent of a second rubber reinforcing carbon black and from about 10 to about 50 weight percent precipitated silica together with silica coupler for said precipitated silica containing a moiety reactive with hydroxyl groups on said precipitated silica and another different moiety interactive with said diene-based elastomers,
   wherein for said tread cap and said tread sub-cap rubber compositions, said specialized cis 1,4-polybutadiene rubber has a microstructure comprised of about 90 to about 99 percent cis 1,4-isomeric units, a number average molecular weight (Mn) in a range of from about 90,000 to about 220,000 and a heterogeneity index (Mw/Mn) in a range of from about 2.5/1 to about 5/1, and
   said designated cis 1,4-polybutadiene rubber has a microstructure comprised of about 96 to about 99 percent cis 1,4-isomeric units, a number average molecular weight (Mn) in a range of from about 150,000 to about 300,000 and a heterogeneity index (Mw/Mn) in a range of from about 1.5/1 to about 2/1,
   wherein said first rubber reinforcing carbon black for said tread cap rubber composition has an iodine adsorption value (ASTM D1510) in a range of from about 100 to about 150 g/kg together with a dibutyphthalate (DBP) adsorption number (ASTM D2414) of from about 110 to about 150 cc/100 g, and
   wherein said second rubber reinforcing carbon black for said tread sub cap rubber composition has an iodine adsorption value (ASTM D1510) in a range of from about 70 to about 130 g/kg together with a dibutyphthalate (DBP) adsorption number (ASTM D2414) of from about 80 to about 130 cc/100 g.

2. The tire of claim 1 wherein the tread cap and tread sub cap components are sulfur cured tire components.

3. The tire of claim 1 wherein the tread cap rubber composition contains levels of the said designated (BR1) and specialized (BR2) cis 1,4-polybutadiene rubbers different from the levels of said designated (BR1) and specialized (BR2) cis 1,4-polybutadiene rubbers contained in said tread sub cap rubber composition.

4. The tire of claim 1 wherein said tread cap rubber composition contains up to about 40 phr of at least one additional diene-based elastomer (R'), wherein (A) NR=100−BR−R'
(B) BR is in a range of from about 20 to about 80 (phr)
(C) BR=BR1+BR2, wherein:
  (1) if BR is less than or equal to 40 phr, BR=BR1,
  (2) if BR is greater than 40 phr, $$BR1 = 25 + ((BR-25)/2) \times Y$$

where Y=is a value in a range of from 0.2 to 1.6.

5. The tire of claim 4 wherein said additional diene-based elastomer (R') is comprised of a styrene/butadiene rubber (SBR).

6. The tire of claim 5 wherein the tread cap rubber composition contains from about 10 to about 30 phr of said styrene/butadiene rubber.

7. The tire of claim 5 wherein said tread cap rubber composition contains levels of the said designated (BR1) and specialized (BR2) cis 1,4-polybutadiene rubbers different from the levels of said designated (BR1) and specialized (BR2) cis 1,4-polybutadiene rubbers contained in said tread sub cap rubber composition.

8. The tire of claim 1 wherein said specialized cis 1,4-polybutadiene rubber is the product of polymerization of 1,3-butadiene monomer in an organic solvent in the presence of a organonickel based catalyst and said designated cis 1,4-polybutadiene rubber is the product of polymerization of 1,3-butadiene monomer in an organic solvent in the presence of a neodymium based catalyst.

9. The tire of claim 1 wherein said silica coupler is comprised of bis (3-trialkoxysilylalkyl) polysulfide having an average of from 2 to 4 connecting sulfur atoms in its polysulfidic bridge or comprised of an alkoxyorganomercaptosilane.

10. The tire of claim 1 wherein said silica coupler is comprised of bis (3-triethoxysilylpropyl_ polysulfide having an average of from 2 to 4 connecting sulfur atoms in its polysulfidic bridge.

11. The tire of claim 2 wherein said silica coupler is comprised of bis (3-triethoxysilylpropyl) polysulfide having an average of from 2 to 4 connecting sulfur atoms in its polysulfidic bridge.

12. The tire of claim 3 wherein said silica coupler is comprised of bis (3-triethoxysilylpropyl) polysulfide having an average of from 2 to 4 connecting sulfur atoms in its polysulfidic bridge.

13. The tire of claim 4 wherein said silica coupler is comprised of bis (3-triethoxysilylpropyl) polysulfide having an average of from 2 to 4 connecting sulfur atoms in its polysulfidic bridge.

14. The tire of claim 5 wherein said silica coupler is comprised of bis (3-triethoxysilylpropyl) polysulfide having an average of from 2 to 4 connecting sulfur atoms in its polysulfidic bridge.

15. The tire of claim 1 wherein said silica coupler is comprised of an alkoxyorganomercaptosilane.

16. The tire of claim 2 wherein said silica coupler is comprised of an alkoxyorganomercaptosilane.

17. The tire of claim 3 wherein said silica coupler is comprised of an alkoxyorganomercaptosilane.

18. The tire of claim 4 wherein said silica coupler is comprised of an alkoxyorganomercaptosilane.

19. The tire of claim 1 wherein:
(A) said specialized cis 1,4-polybutadiene rubber has a number average molecular weight (Mn) in a range of from about 90,000 to 180,000, and
(B) said designated cis 1,4-polybutadiene rubber has a number average molecular weight (Mn) in a range of from about 200,000 to 300,000.

20. The tire of claim 1 wherein:
(A) the second rubber reinforcing carbon black has:
  (1) an Iodine value in a range of from about 80 to about 125 g/kg, and
  (2) a DBP value in a range of from about 120 to about 128 cc/100 g, and
(B) the first rubber reinforcing carbon black has:
  (1) an Iodine value in a range of from about 128 to about 125 g/kg, and
  (2) a DBP value;
    (a) in a range of from about 118 to about 134 cc/100 g and at least about 5 units greater than the DBP value for the said second carbon black, or
    (b) in a range of from about 112 to about 118 cc/100 g and least 5 units less than the DBP value for said second carbon black.

* * * * *